Oct. 7, 1941.  M. J. JOHNSON  2,258,113
MEASURING OR GAUGE DEVICE
Filed Feb. 15, 1940  2 Sheets-Sheet 1

INVENTOR
Manfred J. Johnson
BY
Johnson, Kline and Smyth
ATTORNEYS

Oct. 7, 1941.　　　M. J. JOHNSON　　　2,258,113
MEASURING OR GAUGE DEVICE
Filed Feb. 15, 1940　　　2 Sheets-Sheet 2
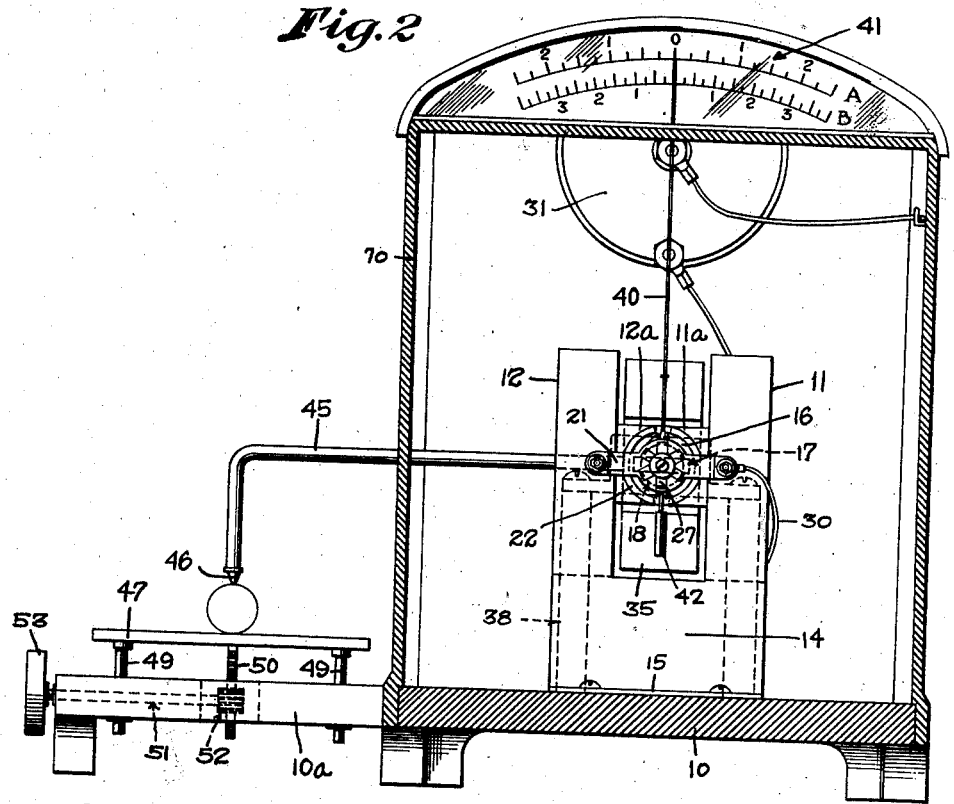
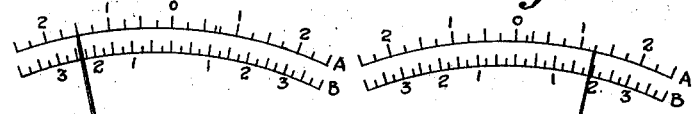
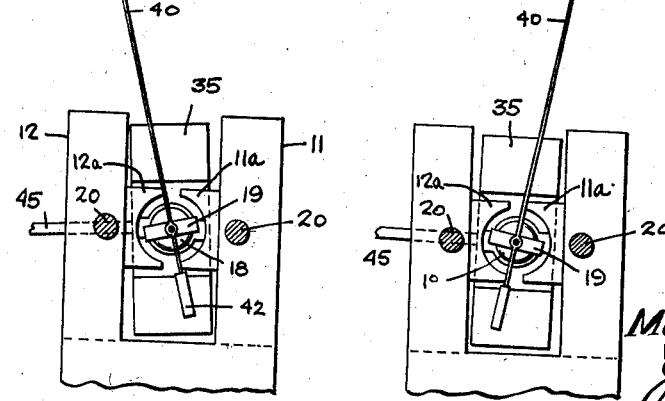
INVENTOR
Manfred J. Johnson
BY
Johnson, Klarand Smith
ATTORNEYS Patented Oct. 7, 1941

2,258,113

UNITED STATES PATENT OFFICE 2,258,113

MEASURING OR GAUGE DEVICE

Manfred J. Johnson, Naugatuck, Conn., assignor to J-B-T Instruments, Inc., New Haven, Conn., a corporation of Connecticut Application February 15, 1940, Serial No. 319,107

13 Claims. (Cl. 33—148)

The present invention relates to a measuring device, and, more particularly, to a device for detecting slight physical changes from a standard measurement.

An object of the present invention is to provide a measuring device or gauge which will be very sensitive and indicate slight changes from a standard, while at the same time being capable of use through various ranges of changes. This is accomplished, according to the present invention, by positioning an armature in a normally balanced magnetic circuit and unbalancing the circuit in accordance with the change in a workpiece from a predetermined standard so as to produce a flux having a direction and magnitude depending upon said change, which flux reacts with the armature to cause a predetermined movement thereof and thus indicate the extent of change in the workpiece from a standard.

While the method producing a balanced magnetic field and unbalancing the same in accordance with the change of a condition may take many forms, in the preferred embodiment of the present invention a pair of soft iron pole pieces are positioned so as to provide an air gap to receive the current-carrying armature. A permanent magnet is disposed midway between the two soft iron pole pieces so as to produce a balanced magnetic circuit in which no flux passes through the air gap to react with the current-carrying armature therein. The permanent magnet is connected to a work-engaging member which, upon detection of a change from the standard in the workpiece, will cause the magnet to be moved from its mid position and toward the soft iron pole pieces and unbalance the magnetic circuit, whereupon a flux will flow through the air gap in accordance with the extent and direction of movement of the permanent magnet. This flux will react with the current-carrying armature and cause the same to rotate in accordance with the direction and amount of flux in the air gap.

An indicator may be connected to the armature and cooperate with a scale to indicate the extent and direction of change from the standard.

A feature of the invention resides in the adaptability of the instrument for a large number of measurements. This is accomplished by providing a circuit for the armature and controlling the current therein so as to vary the effect of the flux flowing through the air gap on the armature so as to cause more or less rotation of the armature, and, consequently, movement of the indicator or pointer.

Another feature of the invention resides in the relatively stationary work-engaging member which is adjustable to accommodate for workpieces of various dimensions whereby the instrument can be used for a wide range of measurements.

In order to prevent the needle from fluctuating too rapidly, upon detection of a change from the standard, the present invention provides a damping device for retarding movement of the needle. The damping effect becomes greater, according to the present invention, as the needle moves towards the ends of the scale.

Other features and advantages will be apparent from the specification and claims, when taken in connection with the drawings, in which:

Fig. 2 shows a sectional view, taken along lines 2—2 of Figure 1.

Fig. 4 shows the relationship existing between the permanent magnet and pole pieces upon detection of an undersized piece of work.

Fig. 5 is a view similar to Fig. 4, showing the detection of an oversized piece of work.

The measuring device of the present invention is very sensitive and is particularly adaptable for detecting in the piece to be measured small physical changes from a standard.

Figure 1:
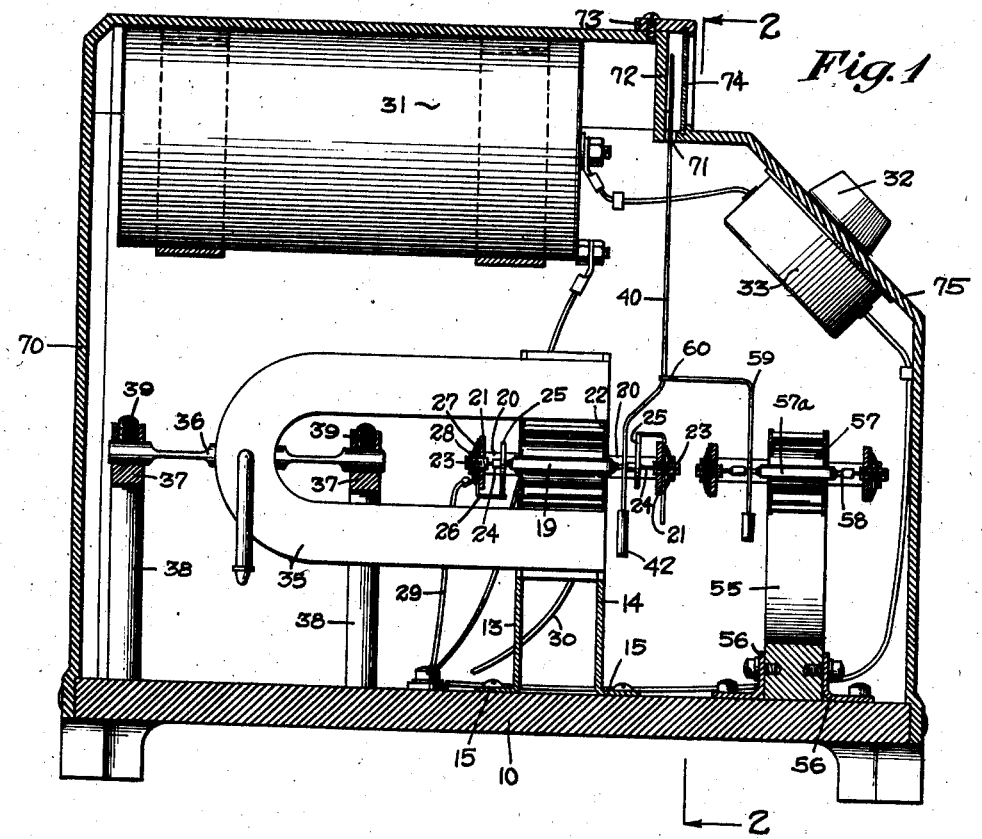
Figure 1 shows a longitudinal sectional view of the device of the present invention.
Figure 3:
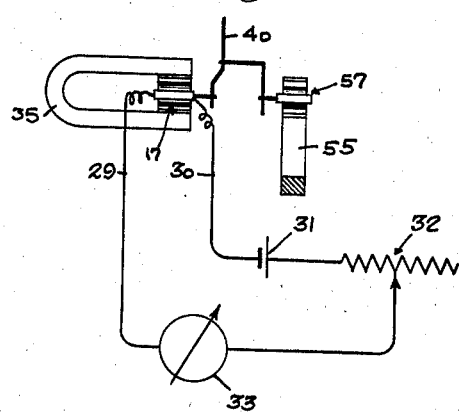
Fig. 3 shows a wiring diagram for the adjustable armature circuit.

In the preferred embodiment of the present invention, the instrument comprises a base 10 upon which is mounted a pair of soft iron pole pieces 11, 12. As shown in Fig. 1, the pole pieces are supported in spaced relation by being clamped between the legs of a pair of U-shaped plates 13, 14, of brass or other nonmagnetic material, each of which has a flange 15 secured to the base by screws or the like.

The pole pieces are provided with portions 11a, 12a, intermediate their ends and projecting toward one another to form a substantially cylindrical air gap 16, as shown in Fig. 2, for receiving a cylindrical armature 17.

The armature includes a current-carrying coil 19 rotatably disposed about a fixed core 18. The core is held in place by rings 22 as is well known in the art. While the armature may be mounted in many ways, in the illustrated form of the invention a pair of posts 20 is secured to each of the plates 13 and 14 and project therefrom. The free ends of the posts are connected by transversely extending plates 21.

Each plate is insulated from the posts and is provided with an aperture at the center into which is threaded a bearing 23 for rotatably receiving and supporting an end of the armature shaft 24. Preferably, a jewelled bearing is used in order to reduce friction and secure a smoother operation of the armature.

The armature is normally held with its coil in a predetermined position with respect to the pole pieces. In the illustrated form of the invention, I have shown the coil 19 as being in alignment with the portions 11a, 12a so as to obtain a maximum reaction when a magnetic flux is set up in the air gap. To so hold the armature in this position and yet permit it to rotate in either direction as required, I have provided a pair of helical springs 25, disposed one at each end of the shaft. These springs have one end secured to the shaft and the other end secured to an arm 26 carried by the plate 21, and are clamped thereto by means of a friction washer 27 locked in place by a nut 28.

These helical or torsion springs can also be used as a means for connecting the movable coil in an electrical circuit. For this purpose, the ends of the spring adjacent the shaft are connected to the ends of the coil and the other ends of the springs are connected through conductors 29, 30 to a circuit for controlling the amount of current in the armature coil, for the purpose as will hereinafter be described. This circuit includes a source of energy or battery 31, a variable resistance 32, and a milliammeter 33 for indicating the amount of current flowing in the circuit.

As shown in Fig. 2, a U-shaped permanent magnet 35 is mounted on the base with the ends thereof disposed between the pair of spaced pole pieces. The magnet is mounted on a torsion shaft 36 which has its ends adjustably supported by a transversely extending yoke 37 at each end, each yoke being supported at the ends thereof by a post 38 mounted on the base. The torsion shaft is secured in the yoke by setscrews 39 threaded in the yoke, and, by properly adjusting the position of the shaft in the yoke, the force applied to urge the magnet and associated elements into work-engaging position can be regulated.

Normally, the soft iron pole pieces 11, do not set up any flux in the air gap which will react with the coil to cause the armature to rotate. When the permanent magnet is disposed in the position shown in Fig. 2, wherein its ends are magnetically equidistant from each of the pole pieces, the magnet circuit, including the pole pieces, will be balanced and still no flux will flow in the air gap. However, the slightest movement of the permanent magnet from the central position in either a clockwise or a counterclockwise direction will cause the ends thereof to move closer to the opposite ends of the pole pieces and reduce the air gap therebetween. This will cause an unbalanced condition to exist, whereupon a flux will flow between the portions 11a, 12a. The amount of flux and its direction of flow are dependent upon the direction and extent of movement of the magnet. This sets up a field in the air gap which will react with the field set up by the current-carrying armature and cause the same to rotate a distance dependent upon the amount of flux in the gap. The armature has mounted thereon an indicator needle 40 which cooperates with a scale 41 to indicate the amount of movement of the armature. A suitable counterbalance 42 can be provided on the needle if desired.

This system may be considered as analogous to a Wheatstone bridge in which the four ends of the soft iron pole pieces represent the four legs of the bridge. When the permanent magnet is in the midposition, the magnetism of the circuit is balanced and no flux flows between the pole pieces through the air gap. However, upon movement of the permanent magnet from its midposition, in either a clockwise or counterclockwise direction, it will, as it approaches the ends of the soft iron pole pieces, in effect, change the opposing branches of the bridge to cause an unbalance to exist and flux will flow through the air gap in a manner analogous to the current flowing across the terminals of a Wheatstone bridge.

According to the present invention, the reaction of the flux on the armature, due to the slight movements of the permanent magnet, is utilized to detect and measure small changes in the work to be measured or gauged. To effect such a measurement, the permanent magnet is connected to a work-engaging element 45 so as to be moved thereby. While the work-engaging element may take many forms, in the preferred form of the invention, it comprises an L-shaped lever projecting from the side thereof and having a work-engaging point 46. This point is adjustably and removably mounted thereon and should consist of a hardened steel point, a jewel or other suitable hard work-engaging surface.

Cooperating with this movable work-engaging member is a relatively stationary work-engaging member 47. These two work-engaging members may take many forms. For example, they may comprise a caliper for engaging either the inside or outside of an object to be measured, or any other similar type of gauge point.

In the illustrated form of the invention, the stationary member is shown as a platform supported on an extension 10a of the base by a plurality of posts 49 slidably mounted in the base. The center of the platform has depending therefrom a rack 50. The base has a shaft 51 rotatably mounted therein carrying at one end a pinion 52 which cooperates with the rack. A handwheel 53 is mounted on the shaft at the free end thereof. By rotating the handwheel, the work-supporting platform can be raised or lowered.

As was previously mentioned, the torsion shaft carrying the magnet is so adjusted that the magnet will tend to move the work-engaging member carried thereby toward the work-supporting platform.

When it is desired to use the measuring device of the present invention, the current in the armature coil is checked, and then a standard measurement, such as a Johanson gauge block, is positioned between the work-supporting table and the work-engaging member. The work-supporting table is then adjusted until the permanent magnet is moved against the torsion shaft and into the position shown in Fig. 2, wherein it is equally spaced from either of the pole pieces. This will cause the balanced condition to exist in the magnetic circuit, and the armature will assume its normal position and the indicator will point to zero on the scale and establish a standard of measurement against which the various workpieces can be checked.

The Johanson gauge block is then removed and the workpieces, which are to be checked or measured, are then placed on the work-supporting table under the work-engaging member. If the workpiece is of proper dimension, the permanent magnet will assume the position shown in Fig. 2, and the needle will indicate no change from the standard. However, should the workpiece be undersize, then the magnet would move counterclockwise, as shown in Fig. 4, and would cause the armature to be rotated and move the needle to indicate the amount of change from the standard.

Conversely, if the piece is oversize, then the permanent magnet will take up the position shown in Fig. 5 and cause the unbalance of the magnetic circuit to produce a flux in the air gap and cause the armature to rotate in the direction to move the needle across the scale in the opposite direction.

If desired, means may be provided for damping the movement of the armature to prevent the same from undue movement during the measurements. This is preferably a device which operates in accordance with the movement of the armature and may be an air vane or other such damping means.

In the illustrated form of the invention, the damping device comprises a U-shaped magnet 55 secured to the base by a pair of brackets 56 to extend upwardly in spaced relation with the pole pieces and armature 17. A damping armature 57 including a coil 57a is mounted by a shaft 58 between the poles of magnet 55 in a manner similar to the armature 17. While the armature 57 may be directly connected to the shaft 24 to be rotated thereby, it is herein shown as being connected to the armature for movement thereby by an arm 59 having one end secured to the shaft 58 and has the other end 60 forked so as to extend around the indicator 49 to be driven thereby. It will be seen, therefore, that when the indicator moves to the right or left, it will, through its cooperation with the arm 59, cause the armature to rotate in the magnetic field and set up a braking action to retard undue vibrations of the needle.

As is shown in Fig. 2, a pair of scales are provided to cooperate with the indicating needle, and the instrument can be regulated so that either of the scales can be used. In order to change the sensitivity of the instrument, the present invention has provided a means for controlling the amount of current in the armature coil 19, which reacts with the flux in the air gap. By adjusting the value of the current therein, more or less reaction will be obtained between the flux in the air gap and the field set up by the current in the coil, and the pointer can be made to move various extents for a given amount of flux passing through the air gap.

In calibrating the instrument, the proper current value for the scale A is determined and the milliammeter marked with a line indicating the value of the current which must be in the coil when scale A is used.

Another line can be made on the milliammeter to indicate the value of current necessary in the coil when scale B is used. It will be seen, therefore, that the instrument of the present invention can be quickly and easily adjusted to measure accurately changes over a wide range of values.

In actual practice, the instrument has detected changes from a standard measurement to the extent of sixteen parts in a million.

If desired, the instrument can be enclosed in a suitable casing 70, as shown in Fig. 1. The casing illustrated has a slot 71 positioned above the indicating needle and through which it projects and a wall 72 located behind the projecting needle to receive and support the scale 44. A cover 73 having a transparent window 74 is mounted on the casing to enclose the needle and scale. The front portion of the casing is provided with a sloping surface 75 upon which is mounted the rheostat 32 and milliammeter 33 for the armature circuit, these devices being so positioned on the casing that adjustments of the current in the armature circuit can be readily made while the instrument is in position to be used.

I desire it to be understood that I may make changes in the construction, combination and arrangement of the several parts, providing that such changes fall within the scope of the appended claims.

I claim:

1. A measuring device comprising means for producing a balanced magnetic field wherein substantially no flux flows in an air gap therein; an armature in said air gap having a current of predetermined magnitude therein; an indicator connected to said armature; and means for unbalancing said magnetic field in response to a change in measurement from a standard whereby a predetermined flux will react with said armature to cause a movement thereof proportional to the unbalance of the field to indicate the extent and direction of said change.

2. A measuring device comprising means for producing a balanced magnetic field wherein substantially no flux flows in an air gap therein; an armature in said air gap having a current of predetermined magnitude therein; an indicator connected to said armature; means for unbalancing said magnetic field in response to a change in measurement from a standard whereby a predetermined flux will react with said armature to cause a movement thereof proportional to the unbalance of the field to indicate the extent and direction of said change; and means for varying the current in the armature circuit to change the reaction between the armature and flux flowing in the air gap to regulate the extent of the movement of the indicator for a given change in measurement from a standard.

3. A measuring device comprising means for producing a balanced magnetic field in an air gap; an armature in said air gap having a current of predetermined magnitude therein; an indicator connected to said armature; means for unbalancing said magnetic field in response to a change in measurement from a standard whereby a predetermined flux will react with said armature to cause a movement thereof proportional to the unbalance of the field to indicate the extent and direction of said change; and means for changing the extent of movement of said armature for a given change in measurement.

4. A measuring device comprising a balanced magnetic field; an armature in said field having a current of predetermined magnitude therein; an indicator connected to said armature; a plurality of scales cooperating with said indicator; means for unbalancing said magnetic field in response to a change in measurement from a standard whereby a predetermined flux will react with said armature to cause a movement thereof proportional to the unbalance of the field to indicate the extent and direction of said change; means for varying the current in said armature circuit to change the reading from one scale to another; and means for indicating when the proper value of current for either scale is flowing in the armature circuit.

5. A measuring device comprising a frame having a pair of pole pieces mounted thereon so as to form a gap therebetween; a current-carrying armature mounted in the gap; a permanent magnet yieldably mounted in a predetermined position between the pole pieces to produce a balanced magnetic field so that no flux passes through the air gap wherein the armature is positioned; means for shifting the position of the magnet with respect to the pole pieces in response to a change from a standard to produce an unbalance in the field and cause a flux to pass through the air gap in either direction according to the direction and extent of change, said flux reacting with the armature to cause movement thereof in either direction in proportion to the unbalance of the field; and an indicator on said armature for indicating the direction and extent of change.

6. A measuring device comprising a frame having a pair of pole pieces mounted thereon so as to form a gap therebetween; a current-carrying armature mounted in the gap; a permanent magnet yieldably mounted in a predetermined position between the pole pieces to produce a balanced magnetic field wherein no flux passes through the air gap wherein the armature is positioned; means for shifting the position of the magnet with respect to the pole pieces in response to a change from a standard to produce an unbalance in the field and cause a flux to pass through the air gap in either direction according to the direction and extent of change, said flux reacting with the armature to cause movement thereof in either direction in proportion to the unbalance of the field; an indicator on said armature for indicating the direction and extent of change; and means for varying the current in the armature to change the amount of reaction of the flux in the air gap thereon and the extent of movement of the indicator for a predetermined change from a standard.

7. A measuring device comprising a frame having a pair of pole pieces mounted thereon so as to form a gap therebetween; a current-carrying armature mounted in the gap; a permanent magnet yieldably mounted in a predetermined position between the pole pieces to produce a balanced magnetic field wherein no flux passes through the air gap wherein the armature is positioned; work-engaging means connected to the magnet for shifting a position of the magnet with respect to the pole pieces in response to a change from a standard to produce an unbalance in the field and cause a flux to pass through the air gap in either direction according to the direction and extent of change, said flux reacting with the armature to cause movement thereof in either direction in proportion to the unbalance of the field; and an indicator on said armature for indicating the direction and extent of change.

8. A measuring device comprising a pair of work-engaging members; means for adjusting said members to a predetermined standard; and means for indicating a change from said standard comprising a balanced magnetic circuit wherein no flux flows in an air gap therein, an armature in said air gap, means connected to one of said work-engaging members for unbalancing said magnetic circuit to produce a flux in said air gap of a magnitude and direction, dependent upon the magnitude and direction of the change from said standard, to react with said armature and cause movement thereof, and means for indicating such movement.

9. A measuring device comprising a pair of work-engaging members; means for adjusting said members to a predetermined standard; means for indicating a change from said standard comprising a balanced magnetic circuit wherein no flux flows in an air gap therein, an armature in said air gap, means connected to one of said work-engaging members for unbalancing said magnetic circuit to produce a flux in said air gap of a magnitude and direction, dependent upon the magnitude and direction of the change from said standard, to react with said armature and cause movement thereof, and means for indicating such movement; and separate spaced braking means connected to said armature for damping movement of said armature.

10. A measuring device comprising a pair of work-engaging members; means for adjusting said members to a predetermined standard; means for indicating a change from said standard comprising an armature provided with a coil having a predetermined current therein, a balanced magnetic circuit having an air gap wherein no flux flows, the armature being located in said air gap, means connected to one of said work-engaging members for unbalancing said magnetic circuit to produce a flux in said air gap of a magnitude and direction, dependent upon the magnitude and direction of the change from said standard, to react with said armature and cause movement thereof, and means for indicating such movement; and means for varying the current in said armature circuit to change the amount of reaction between the armature and flux to produce more or less movement of the armature for a given change from the standard.

11. A measuring device comprising a pair of work-engaging members; means for adjusting said members to a predetermined standard; means for indicating a change from said standard comprising a balanced magnetic circuit wherein no flux flows in an air gap therein, an armature in said air gap, means connected to one of said work-engaging members for unbalancing said magnetic circuit to produce a flux in said air gap of a magnitude and direction, dependent upon the magnitude and direction of the change from said standard, to react with said armature and cause movement thereof, and means for indicating such movement; and means including a damping armature positioned in a separate magnetic field and driven by said first-named armature for damping the movement of said indicator.

12. A measuring instrument comprising a base; a pair of soft iron pole pieces mounted on the base, said pole pieces forming an armature-receiving air gap; an armature rotatably mounted in the air gap and normally urged into a predetermined position with respect to the pole pieces; means for completing the magnetic circuit including said pole pieces to normally provide a balanced circuit in which no flux passes through said air gap; means responsive to change in a physical dimension of a workpiece from a predetermined standard to cause an unbalance of the magnetic circuit and set up a flux in the air gap to cause movement of the armature; a casing enclosing the magnetic pole pieces and armature and having a scale thereon; and an indicator secured to the armature and cooperating with the scale to indicate the amount of change from the standard.

13. A measuring device comprising means for producing a balanced field having an air gap wherein no flux flows, an armature mounted in said air gap and adapted to react to flux in said gap, an indicator connected to the armature for movement thereby; and means for unbalancing the magnetic field in response to a change in measurement from a standard whereby a predetermined flux will flow in said air gap and react with the armature to cause a movement of the armature proportional to the unbalance of the field to indicate the extent and direction of said change.

MANFRED J. JOHNSON.